May 20, 1969   MASAO KATO   3,445,692
ELECTRIC MOTORS FOR TOYS
Filed Sept. 14, 1965
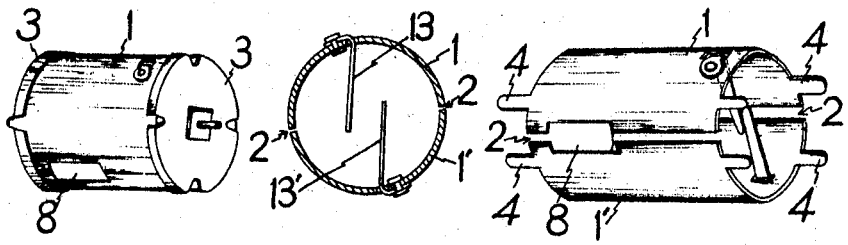
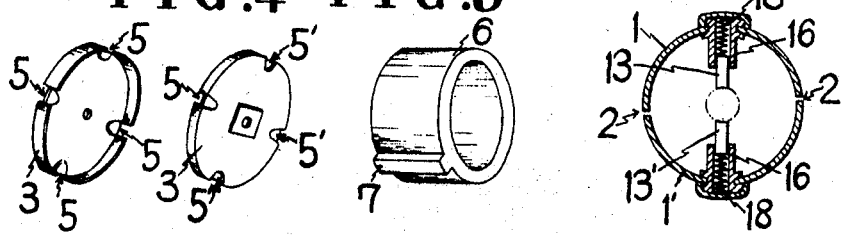
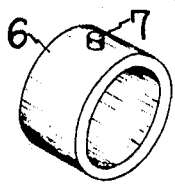
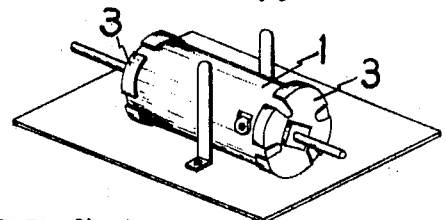
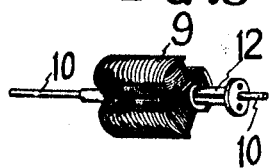
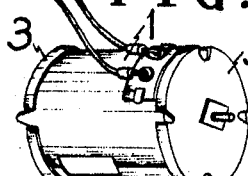
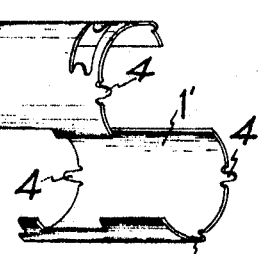
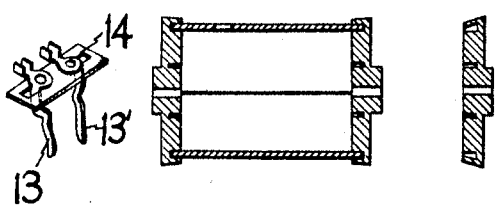
INVENTOR
Masao Kato
BY Ernest Montague
ATTORNEY 3,445,692
ELECTRIC MOTORS FOR TOYS
Masao Kato, 5 3-chome Azuma-bashi, Sumida-ku,
Tokyo, Japan
Filed Sept. 14, 1965, Ser. No. 487,146
Int. Cl. H02k *15/00, 37/00*
U.S. Cl. 310—42
2 Claims

ABSTRACT OF THE DISCLOSURE

A toy motor, comprising a hollow cylindrical case comprising two equal semi-cylindrical sections insulated from each other and having side edges substantially parallel to the axis of the case, insulated end lid plates at each end securing the sections and forming an integral unit, an annular magnet having a projection on a portion of its outer surface disposed within the cylindrical case and the projection inserted into a wedging opening formed by recessed portions of the side edges of the two semi-cylindrical sections, and a rotor rotatably disposed within the magnet.

---

The present invention relates to electric motors, in general, and to a miniature electric motor to be used as a power source for toys and designed to make various motions automatically, in particular. It is one object of the present invention to provide a miniature motor of the above type which meets various requirements, for example, such as a very simple construction, great workability, capable of easy assembly, low manufacturing cost, and positive electrical performance.

It is another object of the present invention to provide a toy motor comprising a cylindrical case formed of en electrically conductive metallic plate member, divided into two parts at right angles to the vertical axis, in an insulated manner, and held together at both ends with insulating material to provide an integral unit, and an annular permanent magnet accommodated in the case, the magnet being provided with a protrusion on part of its outer surface so that the protrusion can fit in a wedging hole provided on the case.

With these and other objects in view which will become apparent in the following detailed description, the present invention will be clearly understood in connection with the accompanying drawing, in which:

FIGURE 1 is a perspective view of a motor embodying the invention, showing a case formed of two identical parts each equipped with a carbon brush;

FIG. 2 is a vertical sectional view of the motor;

FIG. 3 is a perspective view of the case alone;

FIG. 4 is a perspective view of the front and rear sides of an insulating lid plate;

FIG. 5 is a perspective view of an annular magnet;

FIG. 6 is a vertical sectional view of a motor of a modified type;

FIG. 7 is a perspective view of another embodiment of the annular magnet;

FIG. 8 is a perspective view of a rotor alone;

FIG. 9 is a perspective view of a motor according to the present invention as mounted on a base for a toy;

FIG. 10 is a perspective view of an assembled toy motor according to the invention equipped with a brush means of a conventional type which holds a rectifier between a pair of brushes depending from an insulating plate fitted in a through hole provided on a part of the case body;

FIG. 11 is a perspective view of the case body as disassembled;

FIG. 12 is a perspective view of the brush means;

FIG. 13 is a longitudinally sectional side view of a modified combination of a case body and lid plates; and FIG. 14 is a vertically sectional side view of a lid plate.

Referring first to FIGS. 1 to 3, a toy motor according to the invention comprises two semi-cylindrical sections or case members 1 and 1' formed of electrically conductive ferrous metal such as stainless steel and each curved semi-cylindrically so as to form a cylinder with side edges substantially parallel to the axis of the case and defining spaced suitable gaps 2 therebetween. A pair of end lid plates 3, 3 of insulating material, are provided which cooperate lockingly with a plurality of pawls 4 protruding from both ends of the case members 1 and 1'. The pawls 4 are folded in recesses 5' adjacent cut-away portions 5 on the peripheries of the lid plates, thereby securing all the members together to form an integral case body.

An annular permanent magnet 6 is fitted in this case before the above assembling operation and provided with a projection or protrusion 7 on a part of its outer surface. The projection is received in a wedging hole or opening 8 provided by recesses in the sides of the case members 1 and 1', so that the permanent magnet 6 can be secured to the case body.

Both ends of a spindle 10 of a rotor 9 are accommodated inside the permanent magnet 6 and are inserted through and supported rotatably by holes 11 provided in the central portions of the part of insulating lid plates 3. Brushes 13, 13' hold a rectifier 12 for the rotor in between are either attached directly to the case members 1, 1', respectively, as shown in FIG. 2, or are fixed at a suitable distance from each other to a plate 14 of an insulating material which fits in a hole 13 formed on one of the semi-cylindrical case members, and the tips of the brushes are brought into contact with the rectifier 12 and are soldered to lead wires 15, as illustrated in FIGS. 10 through 12.

Preferably the former is utilized wherever possible, because direct attachment of the brushes 13, 13' to the case members 1, 1' simplifies the assembling operation to a considerable extent and makes it possible to dissipate the heat developed by the contact of the brushes and rectifier by pressure, through the respective case members to the atmosphere, thereby eliminating the possibility of burning or seizure at the contact points and, improving the performance of the motor, and other advantages.

In FIG. 6 there is shown a modified brush means of the above type. It consists of a pair of brushes 13, 13' which are supported by small cylinders 16 protruding inwardly of the case members 1, 1', respectively, and are urged against the sides of the rectifier 12 by springs 18 accommodated in the cylinders.

FIGS. 13 and 14 illustrate a modified method of combining the case members with insulating lid plates, whereby both ends of case members 1, 1', are fit in annular grooves 19 provided along the inner peripheries of a pair of insulating lid plates 3, 3. The annular grooves are gradually extended in depth so that they hold firmer grips of the case members.

In conventional motors for toys, a suitable auxiliary part is needed for securing the magnet to the motor case, and assembly thereof is troublesome and the operating efficiency of the motor is severely reduced. With the present invention, by the provision of the protrusion 7 in the outer periphery of the annular magnet 4, together with the fitting engagement of the protrusion 7 with the wedging hole 8, the magnet body 4 can be held more rigidly than the frame, in the range of the common allowances as may be incurred in the production of each of the parts. Accordingly any auxiliary part is not necessary for fitting the magnet to the motor case, and assembly thereof is simple, the number of its production processes is reduced, and its economic advantage is greater. Further, since the magnet is annular and includes the projection 7, which fits into the wedging hole 8 of the frame 1, the characteristics of the motor can be made constant by determining the direction of its magnetic line of force; and by regulating the whirling motion and sliding motion of the magnet, there is provided a superior quality motor for toys.

As described hereinbefore, the toy motors according to the invention are, as a whole, very simple in construction, extremely easy to machine and fabricate, and are nevertheless capable of performing their functions as such in most satisfactory manner, providing a toy motor of great practical values.

While I have disclosed several embodiments of the present invention, it is to be understood that these embodiments are given by example only and not in a limiting sense, the scope of the present invention being determined by the objects and the claims.

I claim:
1. A toy motor, comprising
   a hollow cylindrical case comprising two substantially equal semi-cylindrical sections insulated from each other and each having side edges spaced from each other,
   said semi-cylindrical sections formed of an electrically conductive metallic material,
   an insulated end lid plate at each end of said cylindrical case securing said two substantially equal semi-cylindrical sections constituting an integral unit,
   an annular shaped permanent magnet having a projection on a portion of its outer surface,
   said side edges recessed to form a wedging opening,
   said magnet disposed in said hollow cylindrical case with said projection inserted clampingly in said wedging opening constituting an operative assembled position,
   said wedging opening substantially complementary to said projection in said operative assembled position with said two substantially equal semi-cylindrical sections secured to said end lid plates,
   a rotor means rotatably disposed within said magnet, and
   means for energizing said motor.
2. The toy motor, as set forth in claim 1, wherein
   said insulated end lid plates each include an annular groove portion having an annular groove in which said two substantially equal semi-cylindrical sections are complementarily secured, and
   said annular grooves are extended gradually in depth.

References Cited

UNITED STATES PATENTS

| | | | |
|---|---|---|---|
| 2,532,700 | 12/1950 | Eurich | 310—154 |
| 2,939,024 | 5/1960 | Mabuchi | 310—154 |
| 3,165,654 | 1/1965 | Mabuchi | 310—46 |
| 3,305,741 | 2/1967 | Lindner | 310—261 |

ORIS L. RADER, *Primary Examiner.*

G. NUNEZ, *Assistant Examiner.*

U.S. Cl. X.R.

310—1, 46, 154